(12) United States Patent
Han et al.

(10) Patent No.: US 6,674,906 B1
(45) Date of Patent: Jan. 6, 2004

(54) METHOD AND APPARATUS FOR DETECTING EDGES IN A MIXED IMAGE

(75) Inventors: Yong In Han, Seongnam (KR); Hwe-ihn Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/492,589

(22) Filed: Jan. 27, 2000

(30) Foreign Application Priority Data

Mar. 10, 1999 (KR) .............................. 99-7910

(51) Int. Cl.$^7$ .............................. G06K 9/48; G06K 9/46
(52) U.S. Cl. ........................................ 382/199; 382/202
(58) Field of Search .................................. 382/199, 202

(56) References Cited

U.S. PATENT DOCUMENTS

| | | | | |
|---|---|---|---|---|
| 5,379,130 A | * | 1/1995 | Wang et al. ................. | 358/462 |
| 5,615,287 A | * | 3/1997 | Fu et al. ...................... | 382/232 |
| 5,926,578 A | * | 7/1999 | Fukase et al. ............... | 382/266 |
| 5,974,174 A | * | 10/1999 | Hozumi ....................... | 382/199 |
| 6,356,300 B1 | * | 3/2002 | Shiba ........................... | 348/130 |

\* cited by examiner

*Primary Examiner*—Leo Boudreau
*Assistant Examiner*—Hussein Akhavannik
(74) *Attorney, Agent, or Firm*—Mills & Onello, LLP

(57) ABSTRACT

A method and apparatus for detecting edges by which the detection of the edges of a natural image from an image obtained by mixing the graphic or text and the natural image is suppressed, to thereby stably detect edges of the graphic or the text, are disclosed. In this method, the differences in pixel value between the first pixel of sequentially input images and eight pixels adjacent to the first pixel are obtained. If all of the differences between the first pixel and the eight pixels adjacent to the first pixel are greater than a maximum threshold value or less than a minimum threshold value, the first pixel is determined to be an edge pixel. Likewise, determinations are made as to whether a second pixel, positioned adjacent the first pixel along a first dimension (for example to the left of the first pixel), is an edge pixel and whether a third pixel, positioned adjacent the first pixel along a second dimension (for example above the first pixel), is an edge pixel. Next, if at least one of the first pixel and the second pixel is determined as an edge pixel and if the difference between the first pixel and the second pixel is greater than the maximum threshold value, it is determined that the left edge of the first pixel exists. Also, if at least one of the first pixel and the third pixel is an edge pixel and the difference between the first pixel and the third pixel is greater than the maximum threshold value, it is determined that the upper edge of the first pixel exists.

6 Claims, 10 Drawing Sheets

METHOD AND APPARATUS FOR DETECTING EDGES IN A MIXED IMAGE

BACKGROUND OF THE INVENTION

1. Field of the Invention

The present invention relates to detection of edges of an image, and more particularly, to a method and apparatus for detecting edges of an image obtained by mixing graphic and natural images.

2. Description of the Related Art

In contemporary multimedia personal computers, increasingly complicated images containing a mixture of graphics, text, and natural images are commonly processed. Often times such images are increased or decreased in size on a computer monitor, for example by a user. Such a process is referred to in the art as "zooming" the image. When interpolation is performed to digitally zoom the size of the image, edge information of the image is weakened. Accordingly, edge resolution should be maintained for regions where the edge information is important, such as in a graphic or text region of the image. Additionally, the edge information is required for segmentation of the graphic or text region from the natural image region and appropriate processing thereof.

In a conventional edge detecting process, the focus of the process is commonly on the detection of the edge of the natural image. Consequently, the edge of the graphic or text region accompanying the natural image cannot be effectively and stably detected.

Summary of the Invention

It is an object of the present invention to provide a method for detecting edges by which the detection of the edges of a natural image from an image obtained by mixing the graphic or text and the natural image, is suppressed , to thereby stably detect the edges of the graphic or the text.

It is another objective of the present invention to provide an apparatus for detecting edges by which the detection of the edges of a natural image from an image obtained by mixing the graphic or text and the natural image, is suppressed, to thereby stably detect edges of the graphic or the text.

Accordingly, the method for detecting edges for achieving the first objective is directed to a method for detecting edges in an image formed of pixels arranged in an array having first and second dimensions, each pixel having a data value, comprising: (a) obtaining value differences between a first pixel of the image and eight pixels adjacent the first pixel; (b) determining the first pixel as an edge pixel when all of the value differences between the first pixel and the eight pixels adjacent the first pixel are greater than a predetermined maximum threshold value or less than a predetermined minimum threshold value; (c) obtaining value differences between a second pixel of the image and eight pixels adjacent the second pixel, the second pixel being adjacent the first pixel in the first dimension (for example to the left of the first pixel); (d) determining the second pixel as an edge pixel when all of the value differences between the second pixel and the eight pixels adjacent the second pixel are greater than the maximum threshold value or less than the minimum threshold value; (e) obtaining value differences between a third pixel of the image and eight pixels adjacent the third pixel, the third pixel being adjacent the first pixel in the second dimension (for example above the first pixel); (f) determining the third pixel as an edge pixel when all of the value differences between the third pixel and the eight pixels adjacent the third pixel are greater than the maximum threshold value or less than the minimum threshold value; (g) determining that a first-dimension edge of the first pixel exists, when at least one of the first pixel and the second pixel is an edge pixel and when the value difference between the first pixel and the second pixel is greater than the maximum threshold value; and (h) determining that a second-dimension edge of the first pixel exists, when at least one of the first pixel and the third pixel is an edge pixel and when the value difference between the first pixel and the third pixel is greater than the maximum threshold value.

Preferably, the step (g) comprises the substeps of: determining that a first-dimension first temporary edge of the first pixel exists, when the first pixel is an edge pixel and when the value difference between the first pixel and the second pixel is greater than the maximum threshold value; determining that a first-dimension second temporary edge of the second pixel exists, when the second pixel is an edge pixel and when the value difference between the first pixel and the second pixel is greater than the maximum threshold value; and determining that the first-dimension edge of the first pixel exists, when at least one of the first-dimension first temporary edge of the first pixel and the first-dimension second temporary edge of the second pixel exists.

Preferably, the step (h) comprises the substeps of: determining that the second dimension first temporary edge of the first pixel exists, when the first pixel is an edge pixel and when the value difference between the first pixel and the third pixel is greater than the maximum threshold value; determining that the second-dimension second temporary edge of the third pixel exists, when the third pixel is an edge pixel and when the value difference between the first pixel and the third pixel is greater than the maximum threshold value; and determining that the second dimension edge of the first pixel exists, when at least one of the second-dimension first temporary edge of the first pixel and the second-dimension second temporary edge of the third pixel exists.

The apparatus for detecting edges according to the second objective is directed to an apparatus for detecting edges in images formed of pixels arranged in an array having first and second dimensions, each pixel having a data value, comprising: a pixel difference calculator for obtaining value differences between a sequential set of first pixels of the images and eight pixels adjacent each respective first pixel; an edge pixel determiner for determining the first pixels as edge pixels when the value differences calculated by the pixel difference calculator are greater than a maximum threshold value or less than a minimum threshold value; and an edge determiner for determining that an edge exists between adjacent pixels, when at least one of the adjacent pixels is determined as an edge pixel by the edge pixel determiner and when the value difference between the adjacent pixels is greater than the maximum threshold value.

Preferably, the edge determiner comprises: a temporary edge determiner for determining that a first-dimension first temporary edge of the first pixel exists, when the first pixel is an edge pixel and when the value difference between the first pixel and a second pixel adjacent the first pixel along a first dimension is greater than the maximum threshold value, and determining that a first-dimension second temporary edge of the second pixel exists, when the second pixel is an edge pixel and when the value difference between the adjacent pixels is greater than the maximum threshold value; and a final edge determiner for determining that an edge exists between the first and second pixels, when at least one of the first-dimension first temporary edge and the first-dimension second temporary edge exists.

The edge determiner may further comprise: a temporary edge determiner for determining that a second-dimension first temporary edge of the first pixel exists, when the first pixel is an edge pixel and when the value difference between the first pixel and a third pixel adjacent the first pixel along a second dimension is greater than the maximum threshold value, and determining that a second-dimension second temporary edge of the third pixel exists, when the third pixel is an edge pixel and when the value difference between the adjacent pixels is greater than the maximum threshold value; and a final edge determiner for determining that an edge exists between the first and third pixels, when at least one of the second-dimension first temporary edge and the second-dimension second temporary edge exists.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
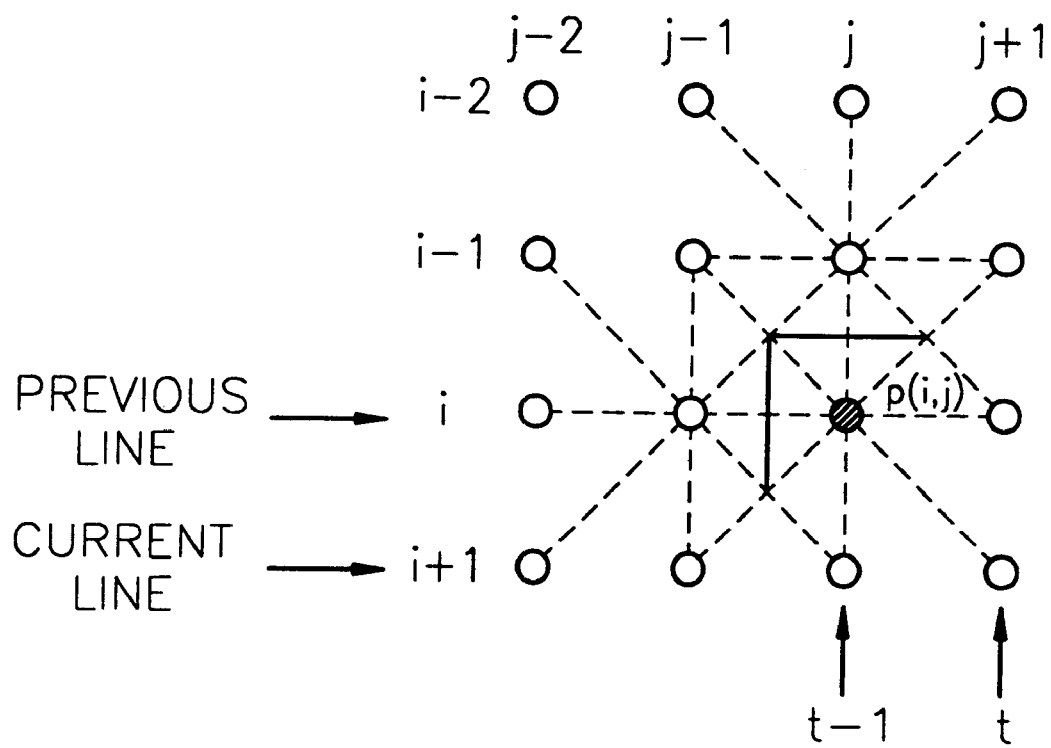
FIG. 1 is an exemplary chart of pixels of an image, for illustrating a method for detecting edges according to the present invention.
Figure 2A:
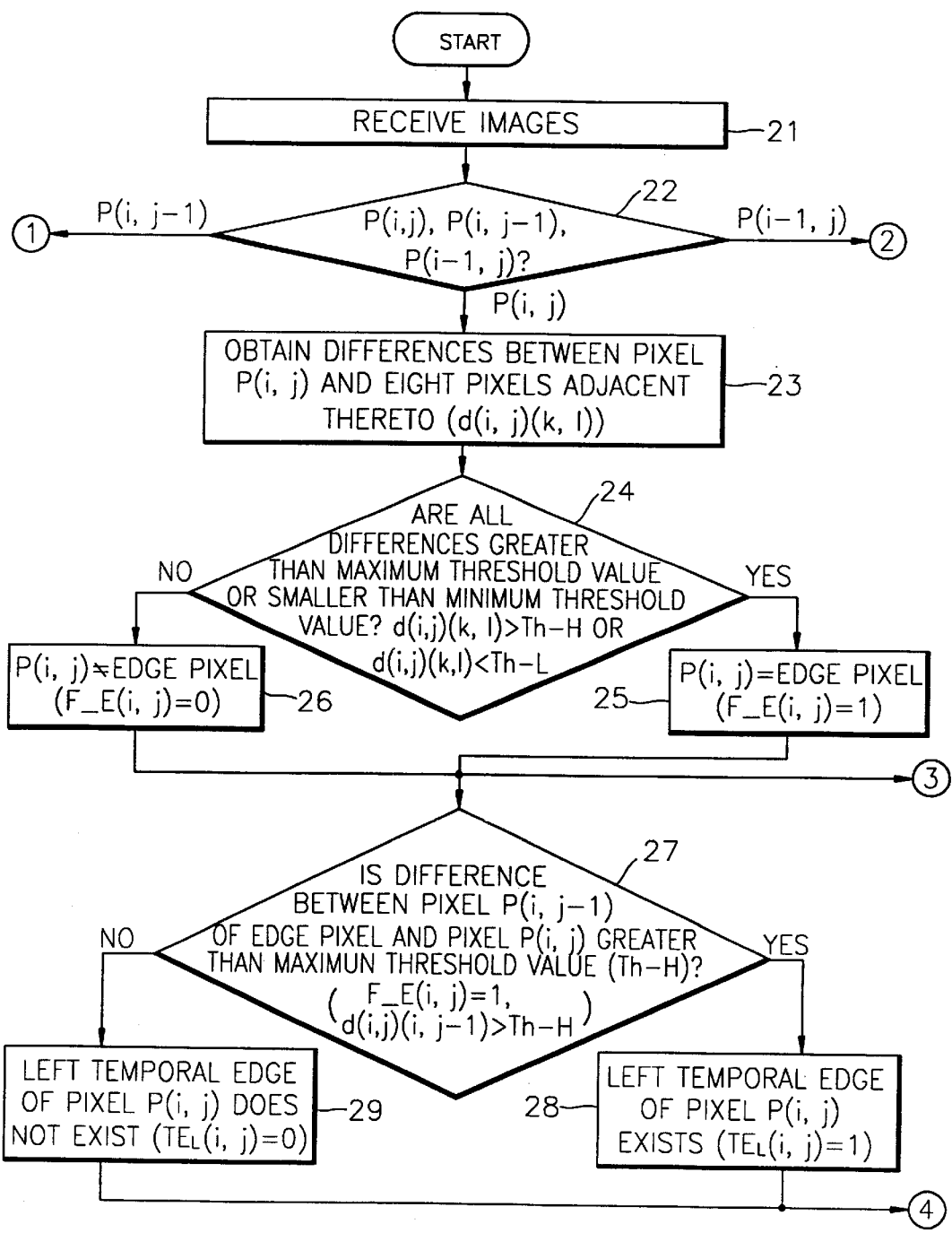
FIGS. 2A through 2D are flow diagrams of a method for detecting edges according to the present invention.
Figure 2B:
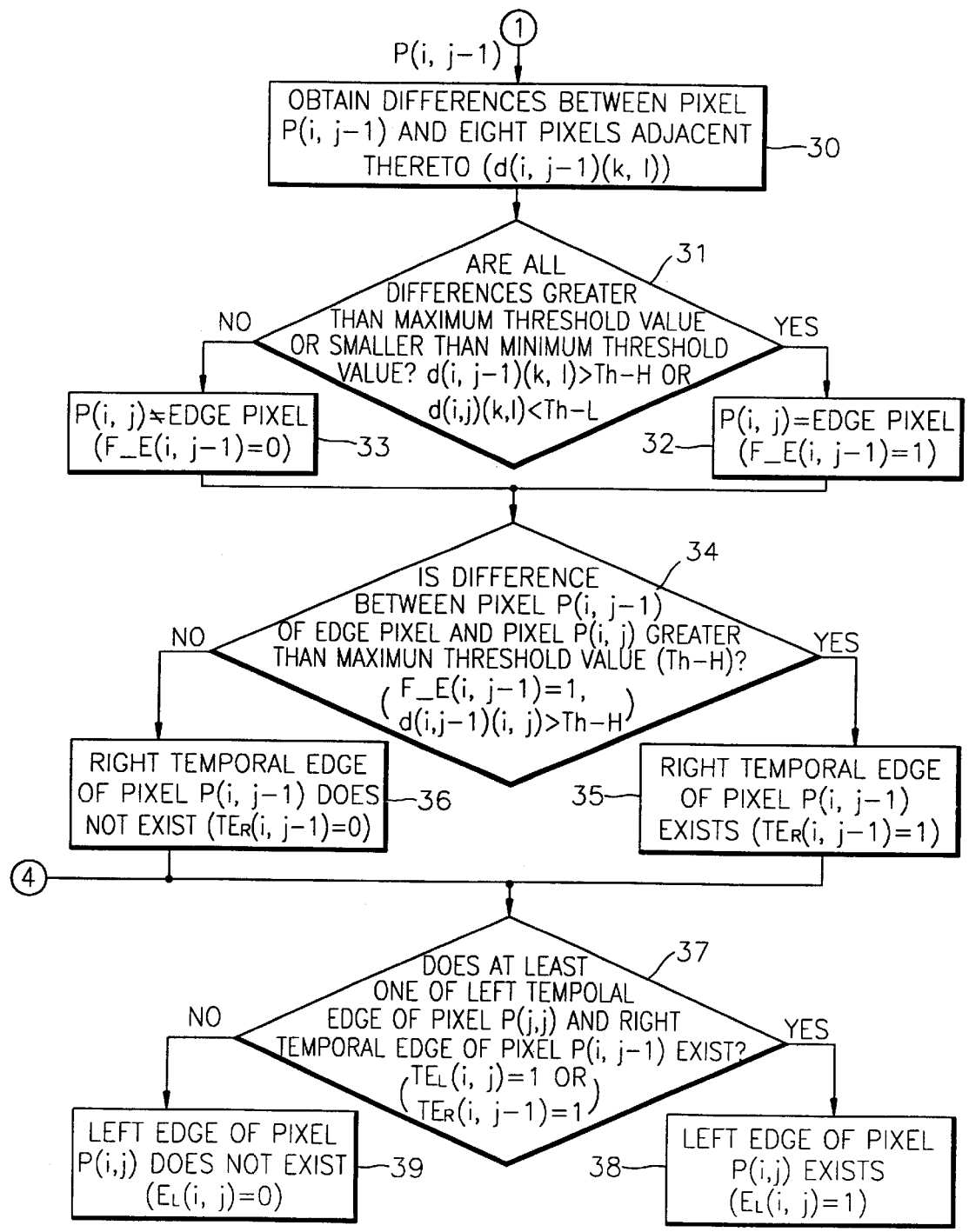
Figure 2C:
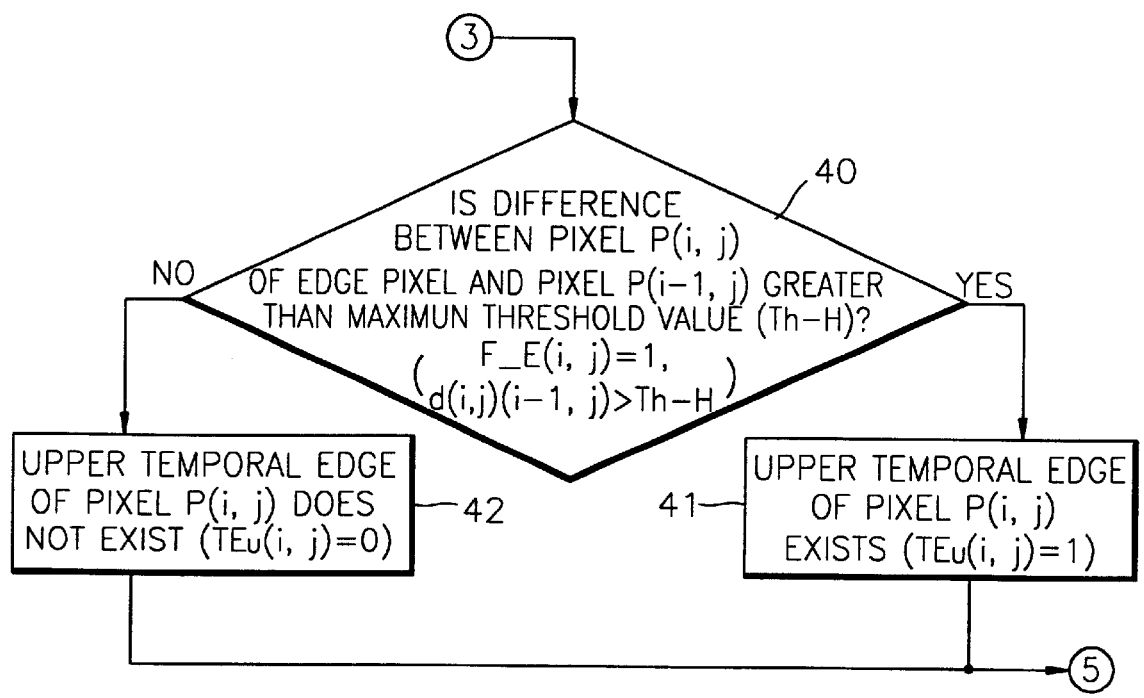
Figure 2D:
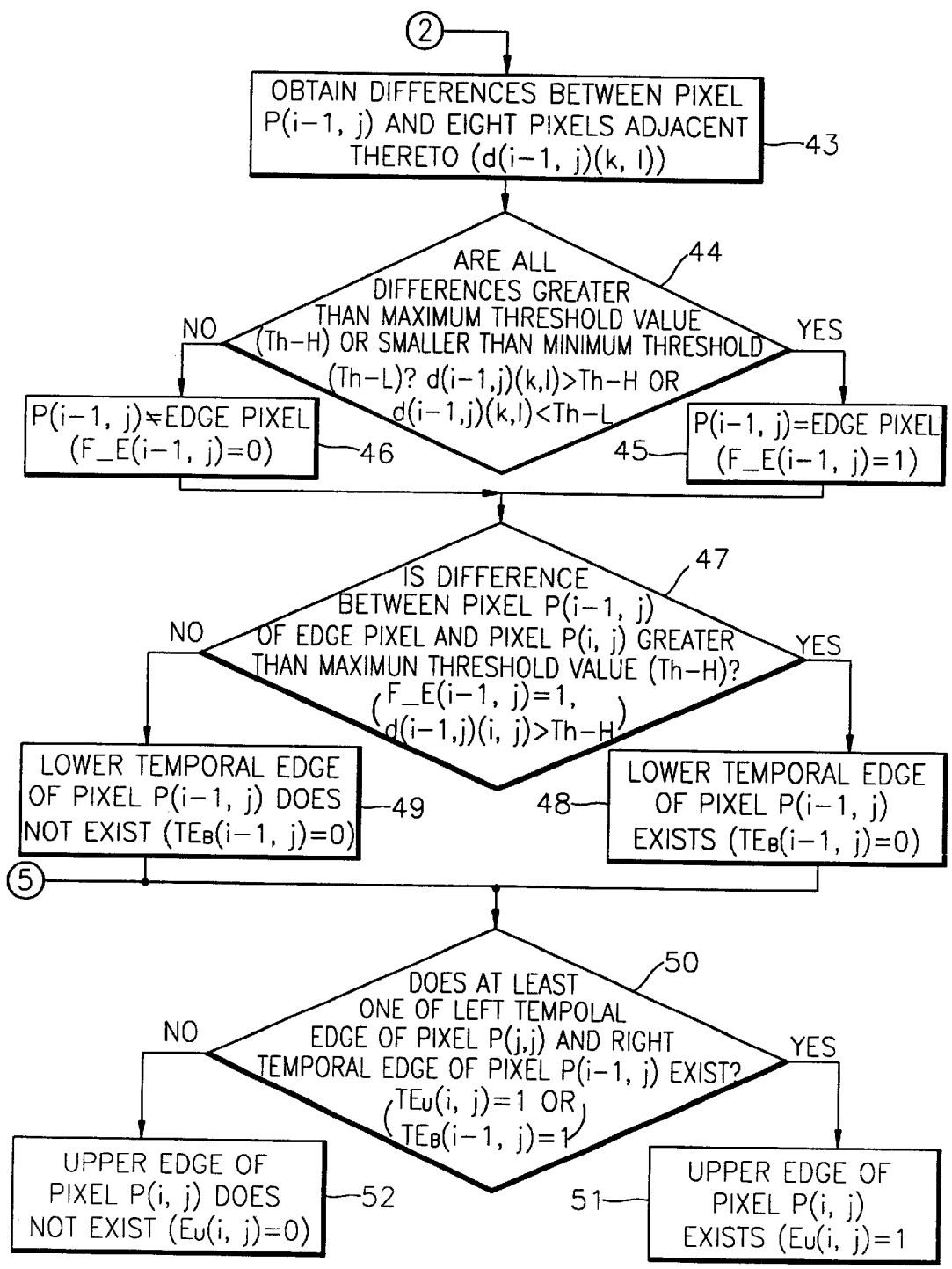

Referring to FIGS. 1 and 2A through 2D, assume pixel P(i,j) to be a current central pixel, that is, a pixel having eight neighboring pixels, of sequentially-input images. Differences in pixel data value, for example grey scale intensity value or color intensity value, are determined between the center pixel P(i,j) and eight neighboring pixels P(i-1,j-1), P(i-1,j), P(i-1,j+1), P(i,j-1), P(i,j+1),P(i+1,j-1), P(i+1,j) and P(i+1, j+1), are obtained (see steps 21, 22 and 23 of FIG. 2A). The differences can be obtained to one of the following relationships of Formulas 1, 2 and 3:

$$d(i,j)(k,l)=|R(i,j)-R(k,l)|+|G(i,j)-G(k,l)|+|B(i,j)-B(k,l)| \quad (1)$$

$$d(i,j)(k,l)=\{R(i,j)-R(k,l)\}^2+\{G(i,j)-G(k,l)\}^2+\{B(i,j)-B(k,l)\}^2 \quad (2)$$

$$d(i,j)(k,l)=\max\{|R(i,j)-R(k,l)|,|G(i,j)-G(k,l)|,|B(i,j)-B(k,l)|\} \quad (3)$$

Here, (k,l) indicates the positions of each of the eight pixels adjacent to the center pixel P(i,j), and R, G and B refer to red, green and blue data elements of the pixel values respectively.

Following this, each of the difference values are compared with a predetermined maximum threshold value Th_H and a predetermined minimum threshold value Th_L. If the difference values are greater than the maximum threshold value Th_H or less than the minimum threshold value Th_L, then the center pixel P(i,j) is determined to be an edge pixel, and if not, the center pixel P(i,j) is determined as a non-edge pixel (see steps 24, 25 and 26 of FIG. 2A). This means that when the differences between the center pixel P(i,j) and eight pixels adjacent to the center pixel are distinct, or if the values of the eight pixels are almost the same as the center pixel P(i,j), then the center pixel P(i,j) is determined as an edge pixel. Also, the difference determining conditions further suppress the effect that noise components have on the image and suppress detection of edges in most natural images, which tend to change gradually. The relationships between steps 24, 25 and 26 can be expressed by Formulas 4 and 5.

$$F\_E(i,j)=1, \text{ if } \forall d(i,j)(k,l)>Th\_H \vee \forall d(i,j)(k,l)<Th\_L \quad (4)$$

$$F\_E(i,j)=0, \text{ if } \exists(k,l) \in N(i,j), Th\_L \leq d(i,j)(k,l) \leq Th\_H \quad (5)$$

Here, N(i,j) indicates a set of the positions of the eight pixels adjacent to the center pixel P(i,j), and F_E(i,j) is the condition for which the center pixel P(i,j) in the position (i,j) is determined as an edge pixel. In other words, if F_E(i,j) is 1, the center pixel P(i,j) is the edge pixel, and if F_E(i,j) is 0, the center pixel P(i,j) is not the edge pixel.

Then, when the center pixel P(i,j) is the edge pixel and the difference between the center pixel P(i,j) and the pixel P(i,j-1), which is the pixel to the left of the center pixel P(i,j), is greater than the maximum threshold value Th_H, it is determined that the left temporary edge of the center pixel P(i,j) exists. Meanwhile, when the center pixel P(i,j) is not the edge pixel or, in other words, when the difference between the center pixel P(i,j) and the pixel P(i,j-1) is smaller than the maximum threshold value Th_H, it is determined that the left temporary edge of the center pixel P(i,j) does not exist (see steps 27, 28 and 29 of FIG. 2A). The relationship between steps 27, 28 and 29 can be expressed by Formula 6.

$$TE_L(i,j)=F\_E(i,j) \wedge Qd(i,j)(i,j-1) \quad (6)$$

Here, $\wedge$ indicates an AND-operation. Qd (i,j)(i,j-1) is equal to 1 if the difference between the center pixel P(i,j) and the pixel P(i,j-1) is greater than the maximum threshold value Th_H, that is, when d(i,j)(i,j-1)>Th_H, and is 0, if not referring to Formula 6, if F_E(i,j) is 1 and Qd(i,j)(i,j-1) is 1, $TE_L(i,j)$ becomes 1. That is, the left temporary edge of the center pixel P(i,j) exists. Meanwhile, when F_E(i,j) or Qd(i,j)(i,j-1) is 0, $TE_L(i,j)$ becomes 0. That is, the left temporary edge of the center pixel P(i,j) does not exist.

It is next determined whether the pixel P(i,j-1), which is the left pixel of the center pixel P(i,j), is the edge pixel or not, and whether the right temporary edge of the pixel P(i,j-1) exists or not. The process is performed in the same manner as steps 23 to 29.

In detail, the differences between the pixel P(i,j-1) and the eight pixels P(i-1,j-2), P(i-1,j-1), P(i-1,j), P(i,j-2), P(i,j), P(i+1,j-2), P(i+1,j-1) and P(i+1,j), which are adjacent to the pixel P(i,j-1), are obtained (steps 22 and 30). The differences can be obtained using one of Formulas (1), (2) and (3) as shown in step 23. The difference between P(i,j-1) and P(i,j) may be the same as the value obtained from step 23.

The differences obtained from step 30 are compared with the predetermined maximum threshold value Th_H and minimum threshold value Th_L. If the differences are greater than the maximum threshold value Th_H or smaller than the minimum threshold value Th_L, it is determined that the pixel P(i,j-1) is an edge pixel, and if not, it is determined that the pixel P(i,j-1) is not an edge pixel (steps 31, 32, 33). The relationships between the steps 31, 32 and 33 can be expressed by Formulas 7 and 8.

$$F\_E(i,j-1)=1, \text{ if } \forall d(i,j-1)(k,l) > Th\_H \vee \qquad (7)$$
$$\forall d(i,j-1)(k,l) < Th\_L$$

$$F\_E(i,j-1)=0, \text{ if } \exists (k,l) \in N(i,j), \qquad (8)$$
$$Th\_L < d(i,j-1)(k,l) < Th\_H$$

Here, N(i,j) indicates a set of positions of eight pixels adjacent to the center pixel P(i,j), and F_E(i,j-1) is a condition in which the pixel P(i,j-1) in the position (i,j-1) is an edge pixel. In other words, when F_E(i,j-1) is 1, the pixel P(i,j-1) is the edge pixel, and when F_E(i,j-1) is 0, the pixel P(i,j-1) is not an edge pixel.

Then, when the pixel P(i,j-1) is the edge pixel and the difference between the pixel P(i,j-1) and the center pixel P(i,j) is greater than the maximum threshold value Th_H, it is determined that a right temporary edge of the pixel P(i,j-1) exists. Meanwhile, when the pixel P(i,j-1) is not the edge pixel or the difference between the pixel P(i,j-1) and the center pixel P(i,j) is smaller than the maximum threshold value Th_H, it is determined that the right temporary edge of the pixel P(i,j-1) does not exist (see steps 34, 35 and 36 of FIG. 2B). The relationship between steps 34, 35 and 36 can be expressed by Formula 9.

$$TE_R(i,j-1) = F\_E(i,j-1) \wedge Qd(i,j-1)(i,j) \qquad (9)$$

Here, $\wedge$ indicates an AND-operation. Qd(i,j-1)(i,j) is function 1 if the difference d(i,j-1)(i,j) between the pixel P(i,j-1) and the center pixel P(i,j) is greater than the maximum threshold value Th_H,, and function 0 if not. The parameter d(i,j-1)(i,j) has the same value as that of d(i,j)(i,j-1). Referring to Formula 9, when F_E(i,j-1) is 1 and Qd(i,j)(i,j) is 1, $TE_R$(i,j-1) becomes 1. That is, a right temporary edge of the pixel P(i,j-1) exists. When F_E(i,j-1) or Qd(i,j-1)(i,j) is 0, $TE_R$(i,j-1) becomes 0. That is, a right temporary edge of the pixel P(i,j-1) does not exist.

Then, when it is determined that at least one of the left temporary edge of the center pixel P(i,j) and the right temporary edge of the pixel P(i,j-1) exists in steps 28 and 29 and steps 35 and 36, it is determined that the left edge of the center pixel P(i,j) exists. If not, it is determined that the left edge of the center pixel P(i,j) does not exist (see steps 37, 38 and 39 of FIG. 2B). This is because even if the right edge of the pixel P(i,j-1) does not exist, the left edge of the pixel P(i,j) may exist. That is, this determination is made to more exactly detect edges of the graphic or text. The relationship between steps 37, 38 and 39 can be expressed by Formula 10.

$$E_L(i,j) = TE_R(i,j-1) \vee TE_L(i,j) \qquad (10)$$

Here, $\vee$ indicates an OR-operation. Referring to Formula 10, when $TE_R$(i,j-1) or $TE_L$(i,j) is 1, $E_L$(i,j) becomes 1. That is, the left edge of the center pixel P(i,j) exists. When both $TE_R$(i,j-1) and $TE_L$(i,j) are 0, $E_L$(i,j) becomes 0. That is, the left edge of the center pixel P(i,j) does not exist.

According to steps 27 to 29 and 34 to 39, when the center pixel P(i,j) or the pixel P(i,j-1) adjacent to the right of the center pixel P(i,j) is an edge pixel and the difference between the center pixel P(i,j) and the pixel P(i,j-1) is greater than the maximum threshold value, it is determined that the left edge of the center pixel P(i,j) exists.

It is next determined whether the center pixel P(i,j) is an edge pixel and whether an upper temporary edge of the center pixel P(i,j) exists or not. The process is performed in the same manner as that of steps 27 to 29.

In detail, in steps 23 to 26, when it is determined whether the center pixel P(i,j) is an edge pixel, and then the center pixel P(i,j) is the edge pixel and the difference between the center pixel P(i,j) and the pixel P(i-1,j), which is above the center pixel P(i,j), is greater than the maximum threshold value Th_H, it is determined that the upper temporary edge of the center edge P(i,j) exists. However, when the center pixel P(i,j) is not the edge pixel or when the difference between the center pixel P(i,j) and the pixel P(i-1,j) is smaller than the maximum threshold value Th_H. it is determined that the upper temporary edge of the center pixel P(i,j) does not exist (steps 40, 41 and 42). The relationship between steps 40, 41 and 42 can be expressed by Formula 11.

$$TE_U(i,j) = F\_E(i,j) \wedge Qd(i,j)(i-1,j) \qquad (11)$$

Here, if the difference between the center pixel P(i,j) and the pixel P(i-1,j) is greater than the maximum threshold value Th_H i.e. d(i,j)(i-1,j)>Th_H, then Qd(i,j)(i-1,j) is function 1, and if not, function 0. Referring to Formula 11, when F_E(i,j) is 1 and Qd(i,j)(i-1,j) is 1, $TE_U$(i,j) becomes 1. That is, the upper temporary edge of the center pixel P(i,j) exists. When F_E(i,j) or Qd(i,j)(i-1,j) is 0, $TE_U$(i,j) becomes 0. That is, the upper temporary edge of the center pixel P(i,j) does not exist.

Then, it is determined whether the pixel P(i-1,j), which is above the center pixel P(i,j), is the edge pixel or not and whether the lower temporary edge of the pixel P(i-1,j) exists or not. The process is performed in the same manner as that of steps 23 to 29, as described above.

In detail, the differences between the pixel P(i-1,j) and eight neighboring pixels such as P(i-2,j-1), P(i-2,j), P(i-2,j+1), P(i-1,j-1), P(i-1,j+1), P(i,j-1), P(i,j) and P(i,j+1), which are adjacent to the pixel P(i-1,j), are obtained (steps 22 and 43). The differences can be obtained using one of Formulas 1, 2 and 3 as in step 23. The difference between the pixel P(i-1,j) and the pixel P(i,j) can be the value obtained from step 23. Also, the difference between the pixel P(i-1,j) and the pixel P(i,j-1) can be the value obtained from step 30.

Then, the differences obtained from step 43 are compared with the maximum threshold value Th_H and the minimum threshold value Th_L. If the differences are greater than the maximum threshold value Th_H or smaller than the minimum threshold value Th_L, it is determined that the pixel P(i-1,j) is an edge pixel, and if not, it is determined that the pixel P(i-1,j) is not an edge pixel (steps 44, 45 and 46 of FIG. 2C). The relationships between steps 44, 45 and 46 can be expressed by Formulas 12 and 13.

$$F\_E(i-1,j)=1, \text{ if } \forall d(i-1,j)(k,l) > Th\_H \vee \qquad (12)$$
$$\forall d(i-1,j)(k,l) > Th\_L$$

$$F\_E(i-1,j)=0, \text{ if } \in (k,l) \in N(i,j), \qquad (13)$$
$$Th\_L < d(i-1,j)(k,l) < Th\_H$$

Here, F_E (i-1,j) is a condition in which the pixel P(i-1,j) existing in a position (i-1,j) is an edge pixel. In other words, when F_E(i-1,j)is 1, the pixel P(i-1,j) is an edge pixel, and when F_E(i-1,j) is 0, the pixel P(i-1,j) is not an edge pixel.

Then, when the pixel P(i-1,j) is an edge pixel and the difference between the pixel P(i-1,j) and the center pixel P(i,j) is greater than the maximum threshold value Th_H, it is determined that the lower temporary edge of the pixel P(i-1,j) exists. Meanwhile, when the pixel P(i-1,j) is not an edge pixel or the difference between the pixel P(i-1,j) and the center pixel P(i,j) is smaller than the maximum threshold value Th_H, it is determined that the lower temporary edge of the pixel P(i-1,j) does not exist (see steps 47, 48 and 49 of FIG. 2C). The relationship between steps 47, 48 and 49 can be expressed by Formula 14.

$$TE_B(i-1,j)=F\_E(i-1,j) \vee Qd(i-1,j) \tag{14}$$

Here, if the difference between the pixel P(i-1,j) and the center pixel P(i,j) is greater than the maximum threshold value Th_H. i.e., then parameter d(i-1,j)(i,j)>Th_H, Qd(i-1,j)(i,j) is function 1, and if not, 0. The parameter d(i-1,j)(i,j) has the same value as that of the d(i,j)(i-1,j). Referring to Formula 14, when F_E(i-1,j) is 1 and Qd(i-1,j)(i,j) is 1, T(i-1,j) becomes 1. That is, the lower temporary edge of the pixel P(i-1,j) exists. However, when F_E(i-1,j) or Qd(i-1,j)(i,j) is 0, $TE_B$(i-1,j) becomes 0. That is, the lower temporary edge of the pixel P(i-1,j) does not exist.

Then, if it is determined that at least one of an upper temporary edge of the center pixel P(i,j) and a lower temporary edge of the pixel P(i-1,j) exists in steps 41, 42, 48 and 49, it is determined that the upper edge of the center pixel P(i,j) exists. If not, it is determined that the upper edge of the center pixel P(i,j) does not exist (steps 50, 51 and 52). This is because even though the lower edge of the pixel P(i-1,j) does not exist, the upper edge of the pixel P(i,j) may exist as described in steps 37, 38 and 39. That is, this determination is made for more exactly detecting edges of the graphic or text. The relationship of steps 50, 51 and 52 can be expressed by Formula 15.

$$E_U(i,j)=TE_B(i-1,j) \vee TE_U(i,j) \tag{15}$$

Referring to Formula 15, if either $TE_B$(i-1,j) or $TE_U$(i,j) is 1, then E(i,j) becomes 1. In other words, the upper edge of the center pixel P(i,j) exists. However, if both $TE_B$(i-1,j) and $RE_U$(i,j) are 0, $E_U$(i,j) becomes 0. That is, the upper edge of the center pixel P(i,j) does not exist.

According to steps 40 to 42 and 47 to 52, if at least one of the center pixel P(i,j) and the pixel P(i-1,j), which is above the center pixel P(i,j), is an edge pixel and the difference between the center pixel P(i,j) and the pixel P(i-1,j) is greater than the maximum threshold value, it is determined that the upper edge of the center pixel P(i,j) exists.

According to the method for detecting edges, in accordance with the present invention, when the pixel P(i,j) of the images which are sequentially input is a current center pixel, a left edge and an upper edge of the center pixel P(i,j) are obtained. The lower edge of the pixel P(i,j) corresponds to the upper edge of the pixel P(i+1,j), so that when the pixel P(i+1,j) is a current center pixel, a lower edge of the pixel P(i,j) can be obtained. Also, a right edge of the pixel P(i,j) is a left edge of the pixel P(i,j+1), so that when the pixel P(i,j+1) is the current center pixel, the right edge of the pixel P(i,j) can be obtained.

Figure 3:
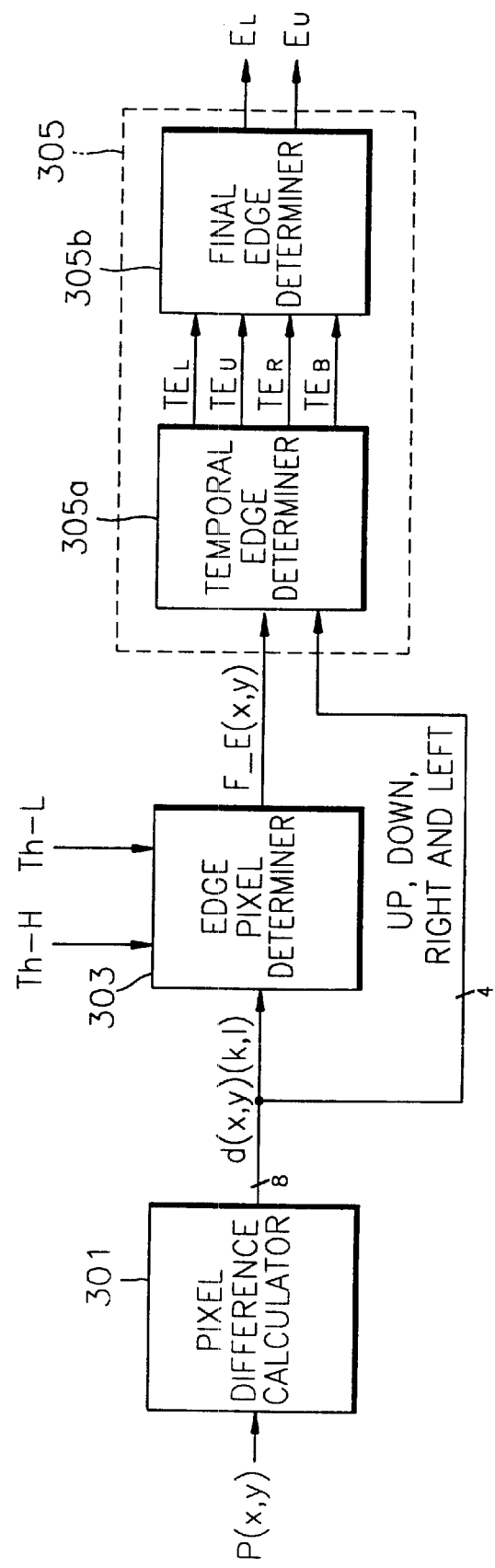
FIG. 3 is a block diagram of an apparatus for detecting edges according to the present invention.

FIG. 3 is a block diagram of an apparatus for detecting edges according to the present invention which is operated according to the above-described method. Referring to FIG. 3, the apparatus for detecting edges according to the present invention includes a pixel difference calculator 301, an edge pixel determiner 303, and an edge determiner 305.

In the pixel difference calculator 301, differences d(x,y)(k,l) between a pixel P(x,y) of images which are sequentially input and eight pixels adjacent thereto are obtained, using one of Formulas 1, 2 and 3. Here, x indicates . . . i-1, i, i+1, . . . , and y indicates . . . j-1, j, j+1, . . . , Also, (k,l) indicates the positions of the eight pixels adjacent to the pixel P(x,y).

In the edge pixel determiner 303, if the differences d(x,y)(k,l) are received and the differences are greater than the maximum threshold value Th_H or smaller than the minimum threshold value Th_L, it is determined that the pixels are edge pixels (F_E(x,y)=1), and if not, it is determined that the pixels are not edge pixels (F_E(x,y)=0).

In the edge determiner 305, if the output d(x,y)(k,l) of the pixel difference calculator 301 and the output F_E(x,y) of the edge pixel determiner 303 are received, and at least one of two predetermined adjacent pixels is an edge pixel and the difference between the two adjacent pixels is greater than the maximum threshold value Th_H, it is determined that an edge between the two adjacent pixels exists. That is, EL=1 or $E_U$=1.

The edge determiner 305 includes a temporary edge determiner 305a and a final edge determiner 305b. The temporary edge determiner 305a determines that the second side temporary edge of the first side pixel exists when the first side pixel of the two pixels adjacent to each other is an edge pixel and the difference between the two pixels is greater than the maximum threshold value Th_H. Also, in the temporary edge determiner 305a, when the second side pixel of the two pixels is an edge pixel and the difference between the two pixels is greater than the maximum threshold value Th_H. it is determined that the first side temporary edge of the second side pixel exists.

In detail, in the temporary edge determiner 305a, when the right pixel P(i,j) of two pixels horizontally adjacent to each other such as P(i,j) and P(i,j-1) is the edge pixel and the difference between the two pixels is greater than the maximum threshold value Th_H, it is determined that the left temporary edge of the right pixel P(i,j) exists, that is, $TE_L$(i,j)=1, and when the left pixel P(i,j-1) of the two pixels is the edge pixel and the difference between the two pixels is greater than the maximum threshold value Th_H, it is determined that the right temporary edge of the left pixel P(i,j-1) exists, that is $TE_R$(i,j-1)=1. When the lower pixel P(i,j) of two pixels vertically adjacent to each other such as P(i-1,j) and P(i,j) is the edge pixel and the difference between the two pixels is greater than the maximum threshold value Th_H, it is determined that the upper temporary edge of the lower pixel P(i,j) exists, that is $TE_U$(i,j)=1, and when the upper pixel P(i-1,j) of the two pixels is the edge pixel and the difference of the two pixels is greater than the maximum threshold value Th_H, it is determined that the lower temporary edge of the upper pixel P(i-1,j) exists, that is $TE_B$(i-1,j)=1.

In the final edge determiner 305b, when either the first side temporary edge or the second side temporary edge exists, it is determined that an edge exists between the two pixels. In detail, in the final edge determiner 305b, when the left temporary edge of the right pixel P(i,j) or the right temporary edge of the left pixel P(i,j-1) exists, that is $TE_L$(i,j)=1 or $TE_R$(i,j-1)=1, it is determined that an edge exists between the pixel P(i,j) and the pixel P(i,j-1). That is, it is determined that a left edge of the pixel P(i,j) exists, that is $E_L$(i,j)=1. In the final edge determiner 305b, when the upper temporary edge of the lower pixel P(i,j) or the lower temporary edge of the upper pixel P(i-1,j) exists, that is, $TE_U(i,j)=1$ or $TE_B(i-1,j)=1$, it is determined that an edge exists between the pixel P(i,j) and the pixel P(i-1,j). That is, it is determined that the upper edge of the pixel P(i,j) exists, that is, $E_U(i,j)=1$.

Figure 4:
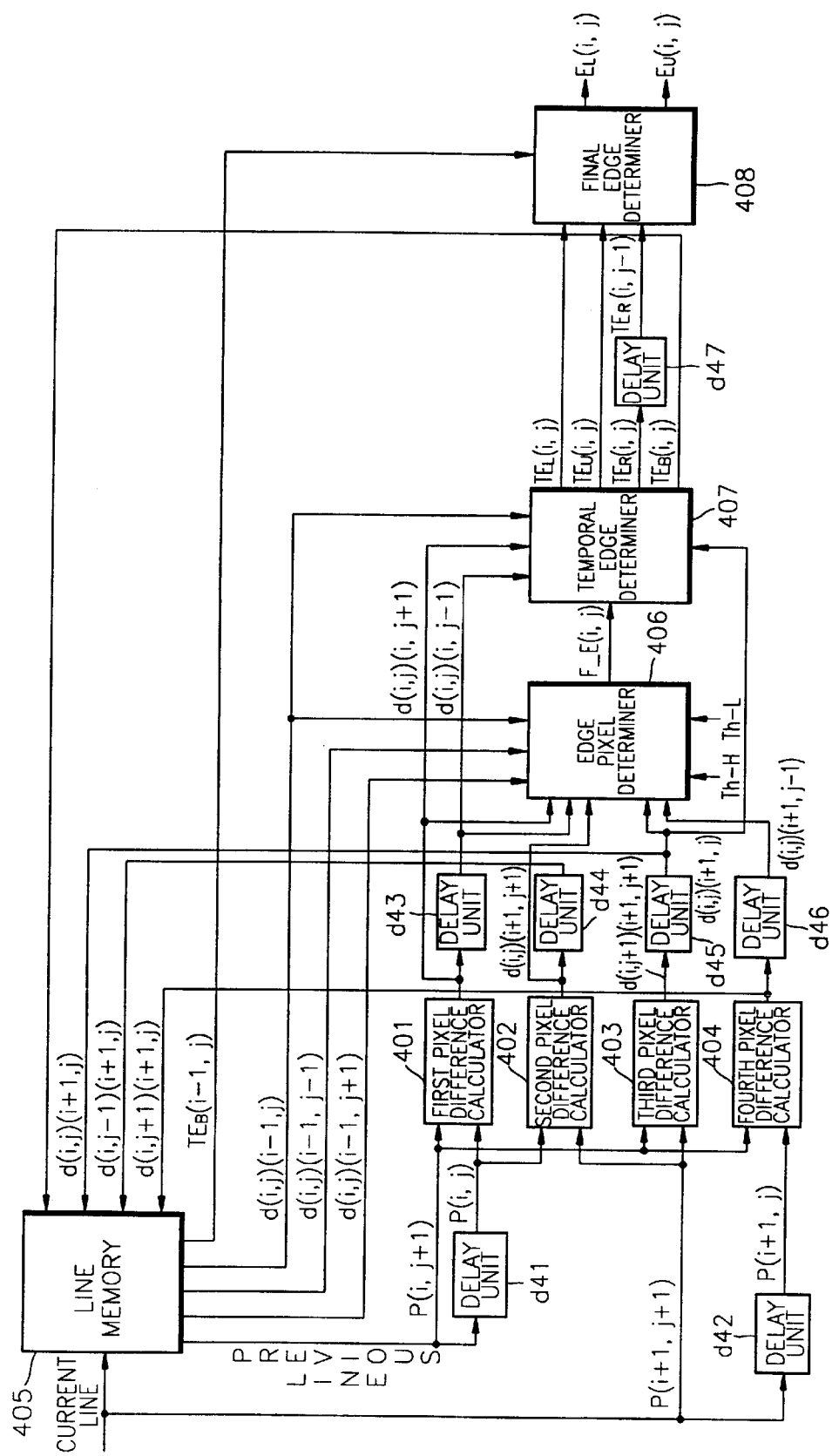
FIG. 4 is a block diagram of a first embodiment of the apparatus for detecting edges of FIG. 3, according to the present invention.

FIG. 4 is a block diagram showing the first embodiment of the edge detector of FIG. 3 according to the present invention. The first embodiment shows the structure of a serial process, where the operation for determining a left edge and an upper edge of a pixel P(i,j) is performed at a timing point t in sequentially input images of FIG. 1.

Referring to FIG. 4, the edge detector according to the first embodiment includes first through fourth pixel difference calculators 401 to 404, a line memory 405, an edge pixel determiner 406, a temporary edge determiner 407, a final edge determiner 408, and a plurality of delay units d41 to d47 composed of flip-flops.

The line memory 405 delays a current line of a sequentially input image by one line and outputs the delayed line. The delay unit d42 delays the pixel P(i+1,j) input at point t-1 of a current line by one clock cycle and outputs the delayed pixel P(i+1,j) at point t, and the delay unit d41 delays the pixel input from the line memory 405 at point t-1such as the pixel P(i,j) input at point t-1of a previous line by one clock cycle and outputs the delayed pixel P(i,j) at point t.

The first pixel difference calculator 401 calculates the difference d(i,j)(i,j+1) between the pixel P(i,j) and the pixel P(i,j+1) and outputs the calculated difference. The second pixel difference calculator 402 calculates the difference d(i,j)(i+1,j+1) between the pixel P(i,j) and the pixel P(i+1, j+1) and outputs the calculated difference. The third pixel difference calculator 403 calculates the difference d(i,j+1)(i+1,j+1) between the pixel P(i,j+1) and the pixel P(i+1,j+1) and outputs the calculated difference. The fourth pixel difference calculator 404 calculates the difference d(i,j+1)(i+1,j) between the pixel P(i,j+1) and the pixel P(i+1,j) and outputs the calculated difference.

The delay unit d43 outputs the difference d(i,j)(i,j-1) between the pixel P(i,j) and the pixel P(i,j-1), which is obtained at point t-1, at point t. The delay d44 outputs the difference d(i,j-1)(i+1,j) between the pixel P(i,j-1) and the pixel P(i+1, j), which is obtained at point t11, at point t. The delay d45 outputs the difference d(i,j)(i+1,j) between the pixel P(i,j) and the pixel P(i+1,j), which is obtained at point t-1, at point t. The delay d46 outputs the difference d(i,j)(i+1,j-1) between the pixel P(i,j) and the pixel P(i+1, j-1), which is obtained at point t-1, at point t.

The line memory 405 delays by one line the difference d(i,j)(i-1,j+1) between the pixel P(i,j) and the pixel P(i-1,j+1) which is obtained at point t of a previous line and outputs the delayed difference at point t of a current line, delays by one line the difference d(i,j)(i-1,j-1) between the pixel P(i,j) and the pixel P(i-1,j-1) which is obtained at point t-4 of a previous line and outputs the delayed difference at point t of a current line, and delays by one line the difference d(i,j)(i-1,j) between the pixel P(i,j) and the pixel P(i-1,j) which is obtained at point t-1of a previous line and outputs the delayed difference at point t of a current line. Meanwhile, the differences obtained from the current line such as d(i,j+1)(i+1,j), d(i,j-1)(i+1,j), and d(i,j)(i+1,j) are delayed by one line and input to the line memory 405 for operation of the next line.

The eight differences between the pixel P(i,j) and the eight pixels such as P(i-1,j-1), P(i-1,j), P(i-1,j+1), P(i,j-1), P(i,j+1), P(i+1,j-1), P(i+1,j) and P(i+1,j+1) are input to the edge pixel determiner 406. In the edge pixel determiner 406, as described in FIG. 3, if the differences are greater than the maximum threshold value Th_H or smaller than the minimum threshold value Th_L, it is determined that the pixel P(i,j) is an edge pixel, where F_E(i,j)=1, and if not, it is determined that the pixel P(i,j) is not an edge pixel, where F_E(i,j)=0.

In the temporary edge determiner 407 as described in FIG. 3, if the pixel P(i,j) is the edge pixel, where F_E(i,j)=1, and the difference d(i,j)(i,j-1) between the pixel P(i,j) and the pixel P(i,j-1) which is the left pixel of the pixel P(i,j) is greater than the maximum threshold value Th_H, it is determined that the left temporary edge of the pixel P(i,j) exists, where $TE_L(i,j)=1$, and if the pixel P(i,j) is the edge pixel, where F_E(i,j)=1, and the difference d(i,j)(i-1,j) between the pixel P(i,j) and the pixel P(i-1,j) which is above the pixel P(i,j), it is determined that the upper temporary edge of the pixel P(i,j) exists, where $Th_U(i,j)=1$.

In the temporary edge determiner 407, if the pixel P(i,j) is the edge pixel, where F_E(i,j)=1, and the difference d(i,j)(i,j+1) between the pixel P(i,j) and the pixel P(i,j+1), which is the right pixel of the pixel P(i,j), is greater than the maximum threshold value Th_H it is determined that the right temporary edge of the pixel P(i,j) exists, where $TE_R(i,j)=1$. Then, the result in which $TE_R(i,j)=1$ is delayed by one clock cycle in the delay unit d47, where $TE_R(i,j-1)=1$. In other words, when the pixel P(i,j-1), which is the left pixel of the pixel P(i,j), is the edge pixel and the difference d(i,j)(i,j-1) between the pixel P(i,j) and the pixel P(i,j-1) is greater than the maximum threshold value Th_H, it is determined that the right temporary edge of the pixel P(i,j-1) exists, where TE(i,j-1)=1.

In the temporary edge determiner 407, if the pixel P(i,j) is the edge pixel, where F_E(i,j)=1 and the difference d(i,j)(i+1,j) between the pixel P(i,j) and the pixel P(i+1,j), which is below the pixel P(i,j), is greater than the maximum threshold value Th_H, it is determined that the lower temporary edge of the pixel P(i,j) exists, where $TE_R(i,j)=1$. Then, the result in which $TE_R(i,j)=1$ is delayed by one line in the line memory 405, where $TE_B(i-1,j)=1$. In other words, if the pixel P(i-1,j) which is above the pixel P(i,j) is an edge pixel and the difference d(i,j)(i-1,j) between the pixel P(i,j) and the pixel P(i-1,j) is greater than the maximum threshold value Th_H, it is determined that the lower temporary edge of the pixel P(i-1,j) exists, where TE(i-1,j)=1.

The operation of the final edge determiner 408 is the same as that described in FIG. 3. The serial edge detector according to the first embodiment can detect edge information from the image which is sequentially input by one line, in real time.

Figure 5:
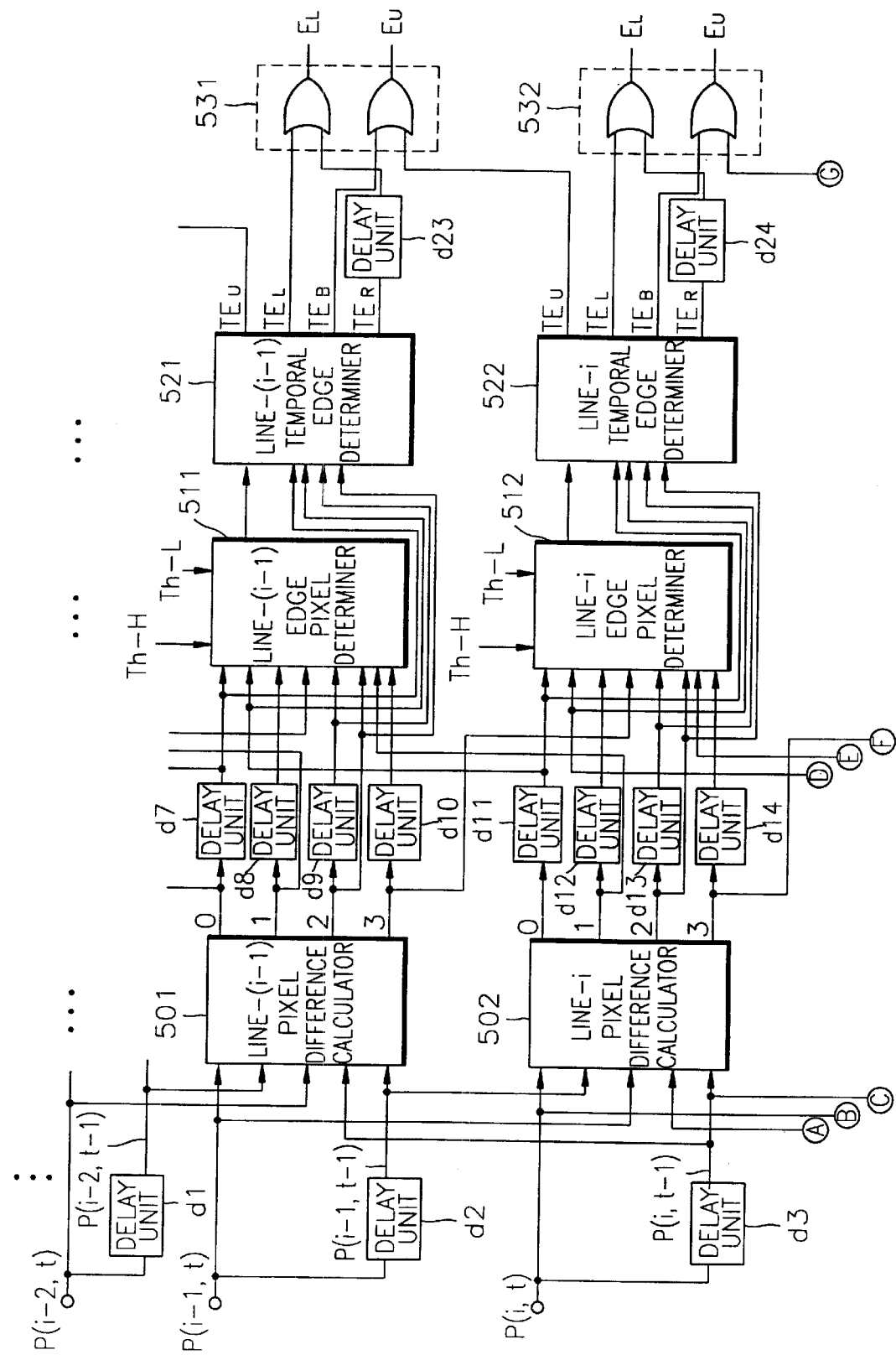
FIG. 5 is a block diagram of a second embodiment of the apparatus for detecting edges of FIG. 3, according to the present invention.
Figure 5:
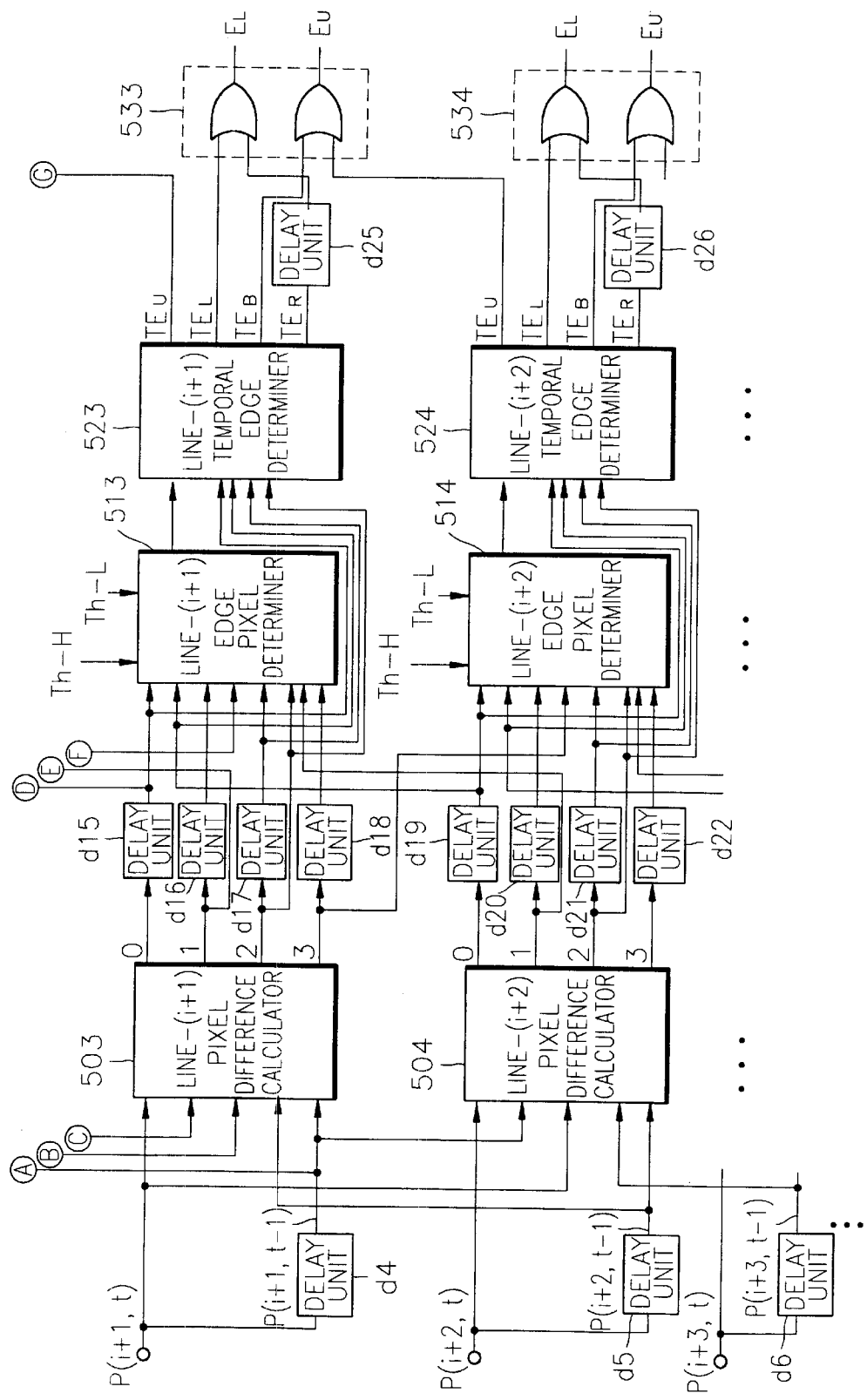

FIG. 5 is a block diagram showing a second embodiment of the apparatus for detecting edges of FIG. 3 according to the present invention. The second embodiment is structured as a parallel process, where when N pixel lines are simultaneously input as shown in FIG. 6, operations for determining N-1 horizontal edges and N vertical edges are Performed.

Figure 6:
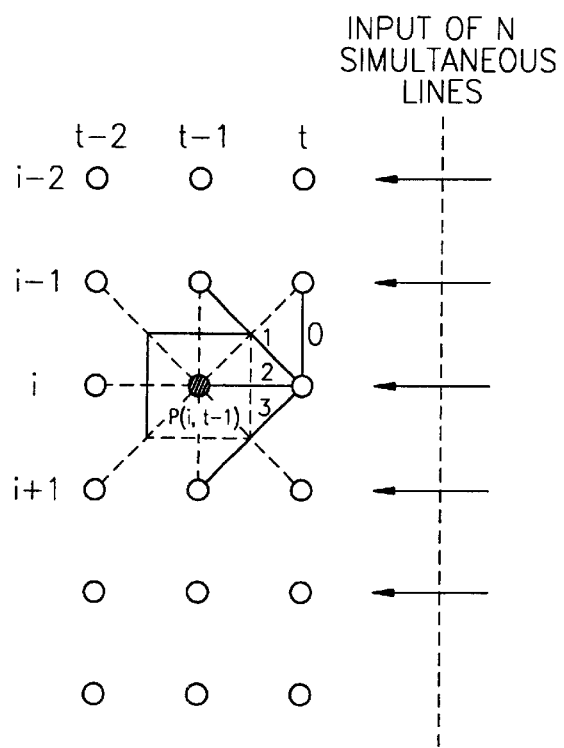
FIG. 6 shows an image in which N pixel lines are input in parallel, in accordance with the present invention.

Referring to FIG. 6, eight pixel differences between a pixel P(i, t-1) and eight pixels adjacent to the pixel P(i, t-1) are required for determining whether a center pixel P(i, t-1) is the edge pixel or not at timing point t when N pixel lines are input. The number of pixel differences to be calculated per pixel at timing point t is four, as shown in FIG. 6.

Thus, four differences d(i, t-1)(i-1, t-1), d(i, t-1)(i-1, t-2), d(i, t-1)(i, t-2) and d(i, t-1)(i+1, t-2) which are calculated from line i at timing point t-1, a difference d(i+1, t-1)(i, t-1) which is calculated from line i+1 at timing point t-1, a difference d(i, t)(i, t-1) which is calculated from line i at timing point t, a difference d(i-1, t)(i, t-1) which is calculated from i-1 at timing point t, and a difference d(i+1, t)(i, t-1) which is calculated from line h+1 at timing point t, determine whether an edge pixel of the central pixel P(i, t-1) exists or not.

Referring to FIG. 5, the edge detector according to the second embodiment includes N pixel difference calculators 501 to 504, N edge pixel determiners 511 to 514, N temporary edge determiners 521 to 524, N-1 final edge determiners 531 to 534, and a plurality of delays d1 to d26.

Here, for convenience, line i will be described. The delay d2 delays by one clock cycle the pixel P(i-1, t-1) input at point t-1 of line i-1 and outputs the pixel P(i-1, t-1) at point t, the delay d3 delays by one clock cycle the pixel P(i, t-1) input at point t-1 of line 1 and outputs the pixel P(i, t-1) at point t and the delay unit d4 delays by one clock cycle the pixel P(i+1, t-1) input at point t-1 of line i+1 and outputs the pixel P(i+1, t-1) at point t.

The pixel difference calculator 502 receives five pixels such as P(i, t), P(i-1, t-1), P(i-1, t), P(i+1, t-1), and P(i, t-1), and calculates four pixel differences d(i, t)(i-1, t)(0), d(i, t)(i-1, t-1)(1), d(i, t)(i, t-1)(2), and d(i, t)(i+1, t-1)(3) and outputs the calculated pixel differences. The delay unit d11 delays the pixel difference d(i, t-1)(i-1, t-1) obtained at point t-1 by one clock cycle and outputs the delayed pixel difference at point t, and the delay unit d12 delays the pixel difference d(i, t-1)(i-1, t-2) obtained at point t-1 by one clock cycle and outputs the delayed pixel difference at point t. The delay unit d13 delays the pixel difference d(i, t-1)(i, t2) obtained at point t-1 by one clock cycle and outputs the delayed pixel difference at point t, and the delay unit d14 delays the pixel difference d(i, t-1)(i+1, t-2) obtained at point t-1 by one clock cycle and outputs the delayed pixel difference at point t. Meanwhile, the pixel differences d(i, t)(i-1, t)(0), d(i, t)(i-1, t-1)(1), d(i, t)(i, t-1)(2), and d(i, t)(i+1, t-1)(3) which are obtained at point t, are delayed by one clock cycle through the delays d11, d12, d13 and d14 for operation at point t+1.

Differences between the pixel P(i t-1) and eight pixels of FIG. 6 are obtained in the above-mentioned manner.

In the edge pixel determiner 512, it is determined by the same operation as the edge pixel determiner of FIG. 4 whether the pixel (i, t-1) is an edge pixel or not, and in the temporary edge determiner 522, it is determined by the same operation as the temporary edge determiner of FIG. 4 whether the left temporary edge $TE_L$, the upper temporary edge $TE_U$, the right temporary edge $TE_R$, and the lower temporary edge $TE_B$ of the pixel P(i, t-1) exist or not. Also, in the final edge determiner 532, it is determined by the same operation of the final edge determiner of FIG. 4 whether the left edge $E_L$ and the upper edge $E_U$ of the pixel P(i, t-1) exist or not. The parallel edge detector according to the second embodiment can simultaneously detect N-I horizontal edges and N vertical edges in real time during parallel input of N lines.

Figure 7:
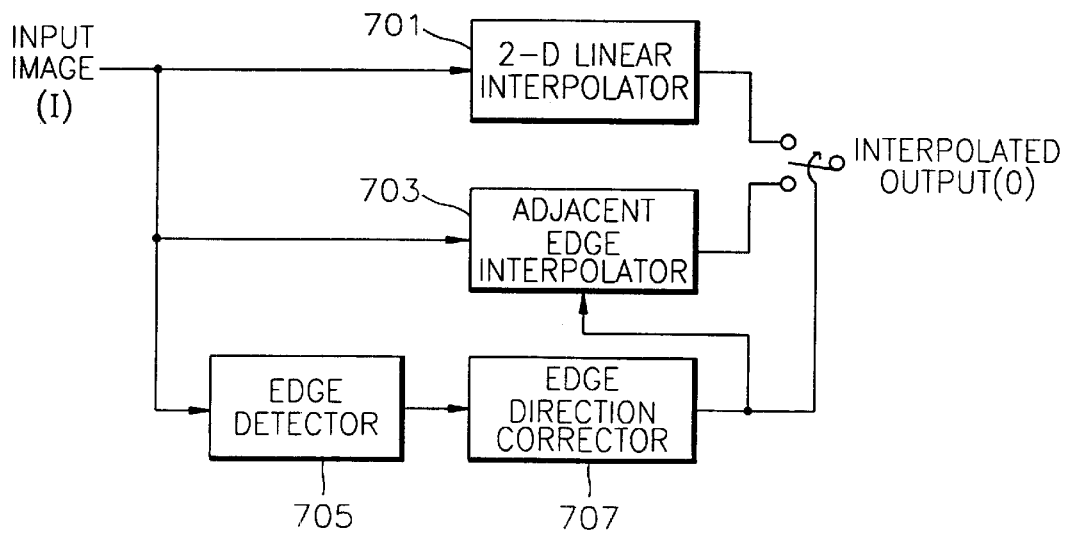
FIG. 7 is a block diagram of an interpolation system using the apparatus for detecting the edges of FIG. 3, according to the present invention.

FIG. 7 shows an application example using an apparatus for detecting edges according to the present invention, and is a block diagram of an interpolation system in which edge components of graphic or text are improved when an image obtained by mixing the graphic or text with a natural image is zoomed.

Referring to FIG. 7, in the interpolation system, an edge detector 705 according to the present invention detects edges of each pixel of an input image I. Here, edge components of the natural image are suppressed and edge components of the graphic or text appear. Then, in an edge-direction corrector 707, upper, lower, left and right edge information detected by the edge detector 705 is transformed to edge information of the up-and-down, left-and-right, and diagonal directions, according to the edge form. In an adjacent edge interpolator 703, an interpolation coefficient to be multiplied by four pixels according to the transformed edge form existing between four adjacent pixels and the pixel to be interpolated, is obtained, and the adjacent edge interpolation is performed. If no edge exists between the four adjacent pixels and the pixel to be interpolated, a typical two-dimensional interpolator 701 performs two-dimensional linear interpolation.

Thus, when an image is zoomed using only the two-dimensional interpolator 701, the edge components of an image are obscure due to loss of high frequency components, while in the interpolation system using the edge detector 705 according to the present invention, the two-dimensional interpolation is performed by the two-dimensional interpolator 701 in a region where the edge information is suppressed and interpolation according to the edge form is performed by the adjacent edge interpolator 703 in a region where the edge information is detected, to thereby maintain the edge form even though the image is zoomed.

According to method and apparatus for detecting edges of the present invention, the detection of edges of a natural image from an image obtained by mixing the graphic or text with the nature image is suppressed, to thereby stably detect edges of the graphic or the text.

While this invention has been particularly shown and described with references to preferred embodiments thereof, it will be understood by those skilled in the art that various changes in form and detail may be made herein without departing from the spirit and scope of the invention as defined by the appended claims.

Listing of claims:

1. A method for detecting edges in an image formed of pixels arranged in an array having first and second dimensions, each pixel having a data value, comprising:

(a) obtaining value differences between a first pixel of the image and eight pixels adjacent the first pixel;

(b) determining the first pixel as an edge pixel when each of the value differences between the first pixel and the eight pixels adjacent the first pixel is greater than a predetermined maximum threshold value or less than a predetermined minimum threshold value;

(c) obtaining value differences between a second pixel of the image and eight pixels adjacent the second pixel, the second pixel being adjacent the first pixel in the first dimension;

(d) determining the second pixel as an-edge pixel when each of the value differences between the second pixel and the eight pixels adjacent the second pixel is greater than the maximum threshold value or less than the minimum threshold value;

(e) obtaining value differences between a third pixel of the image and eight pixels adjacent the third pixel, the third pixel being adjacent the first pixel in the second dimension;

(f) determining the third pixel as an edge pixel when each of the value differences between the third pixel and the eight pixels adjacent the third pixel is greater than the maximum threshold value or less than the minimum threshold value;

(g) determining that a first-dimension edge of the first pixel exists, when at least one of the first pixel and the second pixel is an edge pixel and when the value difference between the first pixel and the second pixel is greater than the maximum threshold value, wherein the step of determining that a first-dimension edge of the first pixel exists comprises the substeps of:

determining that a first-dimension first temporary edge of the first pixel exists, when the first pixel is an edge pixel and when the value difference between the first pixel and the second pixel is greater than the maximum threshold value;

determining that a first-dimension second temporary edge of the second pixel exists, when the second pixel is an edge pixel and when the value difference between the first pixel and the second pixel is greater than the maximum threshold value; and determining that the first-dimension edge of the first pixel exists, when at least one of the first-dimension first tend temporary edge of the first pixel and the first dimension second temporary edge of the second pixel exists; and (h) determining that a second-dimension edge of the first pixel exists, when at least one of the first pixel and the third pixel is an edge pixel and when the value difference between the first pixel and the third pixel is greater than the maximum threshold value.

2. The method of claim 1, wherein the step (h) comprises the substeps of:

determining that the second-dimension first temporary edge of the first pixel exists, when the first pixel is an edge pixel and when the value difference between the first pixel and the third pixel is greater than the maximum threshold value;

determining that the second-dimension second temporary edge of the third pixel exists, when the third pixel is an edge pixel and when the value difference between the first pixel and the third pixel is greater than the maximum threshold value; and determining that the second-dimension edge of the first pixel exists, when at least one of the second-dimension first temporary edge of the first pixel and the second-dimension second temporary edge of the third pixel exists.

3. An apparatus for detecting edges in images formed of pixels arranged in an array having first and second dimensions, each pixel having a data value, comprising:

a pixel difference calculator for obtaining value differences between a sequential set of first pixels of the images and eight pixels adjacent each respective first pixel;

an edge pixel determiner for determining the first pixels as edge pixels when each of the value differences calculated by the pixel difference calculator is greater than a maximum threshold value or less than a minimum threshold value; and an edge determiner for determining that an edge exists between adjacent pixels, when at least one of the adjacent pixels is determined as an edge pixel by the edge pixel determiner and when the value difference between the adjacent pixels is greater than the maximum threshold value, wherein the edge determiner comprises:

a temporary edge determiner for determining that a first-dimension first temporary edge of the first pixel exists, when the first pixel is an edge pixel and when the value difference between the first pixel and a second pixel adjacent the first pixel along a first dimension is greater than the maximum threshold value, and determining that a first-dimension second temporary edge of the second pixel exists, when the second pixel is an edge pixel and when the value difference between the adjacent pixels is greater than the maximum threshold value; and a final edge determiner for determining that an edge exists between the first and second pixels, when at least one of the first-dimension first temporary edge and the first-dimension second temporary edge exists.

4. The apparatus of claim 3, wherein the edge determiner comprises:

a temporary edge determiner for determining that a second dimension first temporary edge of the first pixel exists, when the first pixel is an edge pixel and when the value difference between the first pixel and a third pixel adjacent the first pixel along a second dimension is greater than the maximum threshold value, and determining that a second-dimension second temporary edge of the third pixel exists, when the third pixel is an edge pixel and when the value difference between the adjacent pixels is greater than the maximum threshold value; and a final edge determiner for determining that an edge exists between the first and third pixels, when at least one of the second-dimension first temporary edge and the second-dimension second temporary edge exists.

5. A method for detecting edges in an image formed of pixels arranged in an array having first and second dimensions, each pixel having a data value, comprising:

(a) obtaining value differences between a first pixel of the image and eight pixels adjacent the first pixel;

(b) determining the first pixel as an edge pixel when each of the value differences between the first pixel and the eight pixels adjacent the first pixel is greater than a predetermined maximum threshold value or less than a predetermined minimum threshold value;

(c) obtaining value differences between a second pixel of the image and eight pixels adjacent the second pixel, the second pixel being adjacent the first pixel in the first dimension;

(d) determining the second pixel as an edge pixel when each of the value differences between the second pixel and the eight pixels adjacent the second pixel is greater than the maximum threshold value or less than the minimum threshold value;

(e) obtaining value differences between a third pixel of the image and eight pixels adjacent the third pixel, the third pixel being adjacent the first pixel in the second dimension, (f) determining the third pixel as an edge pixel when each of the value differences between the third pixel and the eight pixels adjacent the third pixel is greater than the maximum threshold value or less than the minimum threshold value;

(g) determining that a first-dimension edge of the first pixel exists, when at least one of the first pixel and the second pixel is an edge pixel and when the value difference between the first pixel and the second pixel is greater than the maximum threshold value; and (h) determining that a second-dimension edge of the first pixel exists, when at least one of the first pixel and the third pixel is an edge pixel and when the value difference between the first pixel and the third pixel is greater than the maximum threshold value, wherein the step of determining that the second-dimension edge of the first pixel exists comprises the substeps of:

determining that the second-dimension first temporary edge of the first pixel exists, when the first pixel is an edge pixel and when the value difference between the first pixel and the third pixel is greater than the maximum threshold value;

determining that the second-dimension second temporary of the third pixel exists, when the third pixel is an edge pixel and when the value difference between the first pixel and the third pixel is greater than the maximum threshold value; and determining that the second-dimension edge of the first pixel exists, when at least one of the second-dimension first temporary edge of the first pixel and the second-dimension second temporary edge of the third pixel exists.

6. An apparatus for detecting edges in images formed of pixels arranged in an array having first and second dimensions, each pixel having a data value, comprising:

a pixel difference calculator for obtaining value differences between a sequential set of first pixels of the images and eight pixels adjacent each respective first pixel;

an edge pixel determiner for determining the first pixels as edge pixels when each of the value differences calculated by the pixel difference calculator is greater than a maximum threshold value or less than a minimum threshold value; and an edge determiner for determining that an edge exists between adjacent pixels, when at least one of the adjacent pixels is determined as an edge pixel by the edge pixel determiner and when the value difference between the adjacent pixels is greater than the maximum threshold value, wherein the edge determiner comprises:

a temporary edge determiner for determining that a second dimension first temporary edge of the first pixel exists, when the first pixel is an edge pixel and when the value difference between the first pixel and a third pixel adjacent the first pixel along a second dimension is greater than the maximum threshold value, and determining that a second-dimension second temporary edge of the third pixel exists, when the third pixel is an edge pixel and when the value difference between the adjacent pixels is greater than the maximum threshold value; and a final edge determiner for determining that an edge exists between the first third pixels, when at least one of the second-dimension first temporary edge and the second-dimension second temporary edge exists.

* * * * *

UNITED STATES PATENT AND TRADEMARK OFFICE
CERTIFICATE OF CORRECTION

PATENT NO.     : 6,674,906 B1
DATED          : January 6, 2004
INVENTOR(S)    : Yong In Han et al.

It is certified that error appears in the above-identified patent and that said Letters Patent is hereby corrected as shown below:

Column 12,
Line 51, delete the hyphen between "an" and "edge".

Column 13,
Line 16, delete "tend".

Signed and Sealed this

Thirteenth Day of April, 2004

JON W. DUDAS
*Acting Director of the United States Patent and Trademark Office*